Patented Dec. 27, 1932                                              1,892,128

UNITED STATES PATENT OFFICE

HENRI BARBIER, OF GENEVA, SWITZERLAND

NITRODERIVATIVE OF BUTYLCYMENE AND THE PROCESS OF PREPARING THE SAME

No Drawing.   Application filed May 29, 1930, Serial No. 457,498, and in Germany April 12, 1930.

It is known that products with a musk like odor, may be obtained by nitration of toluene derivatives which contain a substituted isopropyl, isobutyl or isoamylgroup, and that by substitution of halogen or organic radicals such as CN, CHO, COCH$_3$, OCH$_3$ in the mentioned hydrocarbons different varieties of odor are obtained.

I have found that products having a musk like perfume, which is slightly different from the perfume of the hitherto known commercial musks, can be obtained by nitration of butylcymene, a hydrocarbon derived from toluene and containing simultaneously isopropyl and tertiary butyl groups. So I have obtained by nitration of tertiary butylcymene which was hitherto unknown and the preparation of which is described in my copending application Serial No. 457,497, filed May 29, 1930, products having a musk like odor and which may be employed in the manufacture of perfumes.

The present invention relates to a nitroderivative of butylcymene and to the process for the preparation of the same. This process consists in nitrating butylcymene. Any of the isomers of the butylcymene may be nitrated by this process, but I prefer to nitrate the tertiary butyl-para-cymene and to obtain the dinitro-tertiary-butyl-para-cymene, which, owing to its musk like odor, is adapted for use in the manufacture of perfumes.

For the nitration I employ nitric acid which may be added with of without the commonly used agents, such as sulphuric acid, acetic acid, acetic-anhydride and the like.

The obtained nitrated product is a new product, which has not yet been described or known. It is characterized by the simultaneous presence of isopropyl and tertiary butyl groups in its formula of constitution. Its empirical formula is C$_8$H$_{19}$O$_4$N$_2$, and its structural formula is as follows:

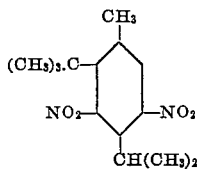

It forms yellowish colored crystals, melting at 132 degrees centigrade. It has a musk like odor allowing the product to be employed in the manufacture of perfumes. The crystals are soluble in alcohol.

In the following I give an example of preparing the nitroderivative of butylcymene according to the present invention. It will however be understood that I do not limit my invention to the precise conditions or proportions hereinafter set forth.

To 10 kgs. fuming nitric acid, while cooling and continuously stirring, 1 kg. tertiary butyl-para-cymene is added whereby the temperature must not exceed 0 degree centigrade. The reaction mixture is then poured into iced water and the formed precipitate is separated from the liquid and washed with alkaline water. The dinitro-isopropyl-tertiary-butyl-toluene (dinitro-tertiary-butyl-para-cymene) is purified by repeated crystallization from a suitable solvent, for instance alcohol; the obtained crystals melt at 132 degrees centigrade; the yield is about 80 to 90 per cent of the theory.

I claim:

1. A di-nitroderivative of tertiary butylcymene.

2. A dinitro-tertiary-butyl-para-cymene, the same forming yellowish colored crystals melting at 132 degrees centigrade, soluble in alcohol and having a musk like odor.

3. The process for the preparation of a nitroderivative of butylcymene, which consists in nitrating tertiary butylcymene, separating the nitrated product from the by-products, and purifying the same.

4. The process which consists in nitrating tertiary butyl-para-cymene at a low temperature, separating the raw dinitro-tertiary-butyl-para-cymene obtained, and purifying the same.

5. The process which consists in treating tertiary butyl-para-cymene with nitric acid at a temperature not exceeding 0 degree centigrade, pouring the reaction mixture into iced water, separating the formed precipitate from the liquor, washing and purifying the same by repeated crystallization in a solvent.

6. The process which consists in adding to fuming nitric acid, while cooling and stirring, tertiary butyl-para-cymene, pouring the reaction mixture into iced water, separating the formed precipitate from the acid liquor, washing the same with alkaline water, purifying the dinitro-tertiary-butyl-para-cymene by repeated crystallization from alcohol.

7. The process which consists in adding to 10 parts by weight of fuming nitric acid, while cooling and continuously stirring, 1 part by weight of tertiary butyl-para-cymene, maintaining the temperature at or below 0 degree centigrade, pouring the reaction mixture into iced water, separating the precipitate from the mother liquor, washing the same with an alkaline liquid, purifying the dinitro-tertiary-butyl-para-cymene by repeated crystallization from alcohol.

In testimony whereof I have affixed my signature.

HENRI BARBIER.